US011205547B2

(12) United States Patent
Einhorn et al.

(10) Patent No.: US 11,205,547 B2
(45) Date of Patent: Dec. 21, 2021

(54) INTELLIGENT SWITCH FOR AUTOMOTIVE APPLICATION

(71) Applicants: TE Connectivity Germany GmbH, Bensheim (DE); TE Connectivity Corporation, Berwyn, PA (US)

(72) Inventors: Joerg Einhorn, Berlin (DE); Ralf Kakerow, Darmstradt (DE); Aruna Lawrence, Bensheim (DE); Mathias Michael, St. Leon-Rot (DE); Georges Ngongang, Longeville les Metz (FR); Ruediger Ostermann, Rimbach (DE); Steve Rohr, Birmingham, MI (US); Abraham Shocket, Cary, NC (US)

(73) Assignees: TE Connectivity Germany GmbH, Bensheim (DE); TE Connectivity Services GmbH, Schaffhausen (CH)

( * ) Notice: Subject to any disclaimer, the term of this patent is extended or adjusted under 35 U.S.C. 154(b) by 123 days.

(21) Appl. No.: 15/784,262

(22) Filed: Oct. 16, 2017

(65) Prior Publication Data

US 2018/0108498 A1    Apr. 19, 2018

(30) Foreign Application Priority Data

Oct. 14, 2016    (EP) .................................... 16194028

(51) Int. Cl.
*H01H 9/54*    (2006.01)
*H01H 50/04*    (2006.01)
(Continued)

(52) U.S. Cl.
CPC .............. *H01H 9/54* (2013.01); *B60R 16/03* (2013.01); *H01H 9/542* (2013.01);
(Continued)

(58) Field of Classification Search
CPC ....... B60R 16/00; B60R 16/02; B60R 16/023; B60R 16/03; H01H 9/54; H01H 50/04;
(Continued)

(56) References Cited

U.S. PATENT DOCUMENTS 4,280,161 A * 7/1981 Kuhn .................... H02H 7/065
361/104
6,087,931 A    7/2000 Matsunaga
(Continued)

FOREIGN PATENT DOCUMENTS

DE    3345701 A1 *  6/1985    ............. H05K 1/144
DE    3345701 A1    6/1985
(Continued)

OTHER PUBLICATIONS

European Search Report, dated Dec. 13, 2016, 8 pages.
(Continued)

*Primary Examiner* — Rexford N Barnie
*Assistant Examiner* — Elim Ortiz
(74) *Attorney, Agent, or Firm* — Barley Snyder (57) ABSTRACT

An intelligent switch for automotive application. In particular, a resettable and/or programmable fuse comprising at least one inlet, at least one outlet, and a switch circuit electrically connecting the at least one inlet and the at least one outlet. In order to provide an intelligent switch for automotive applications that provides more than one switching function, the switch circuit comprises at least two switching submodules selected from an electromechanical switching submodule and an electric switching submodule. The intelligent switch further comprises a control unit for controlling an operating state of the at least two switching submodules.

14 Claims, 7 Drawing Sheets

(51) Int. Cl.
  *B60R 16/03* (2006.01)
  *H01R 13/66* (2006.01)
  *H01H 71/12* (2006.01)

(52) U.S. Cl.
  CPC ....... *H01H 50/048* (2013.01); *H01R 13/6658* (2013.01); *H01H 2071/124* (2013.01); *H01R 2201/26* (2013.01)

(58) Field of Classification Search
  CPC ......... H01H 85/02; H01H 71/12; H02J 13/00; H03K 17/51; H03K 17/00; H03K 17/08; H03K 17/687; H01R 13/66
  See application file for complete search history.

(56) References Cited

U.S. PATENT DOCUMENTS

| | | | |
|---|---|---|---|
| 7,282,924 | B1 | 10/2007 | Wittner |
| 9,156,415 | B2 | 10/2015 | Nakayama |
| 9,806,517 | B2* | 10/2017 | Mo ................... H01M 16/00 |
| 2004/0027734 | A1* | 2/2004 | Fairfax ................. H01H 9/542 361/2 |
| 2006/0040526 | A1 | 2/2006 | Shirota |
| 2012/0026640 | A1* | 2/2012 | Doellerer ............. H01H 9/542 361/190 |
| 2012/0120629 | A1* | 5/2012 | Nakayama ......... B60R 16/0238 361/819 |
| 2012/0293891 | A1 | 11/2012 | Levinas |
| 2015/0372477 | A1* | 12/2015 | Mo ...................... H02J 7/0029 361/91.5 |
| 2016/0203932 | A1* | 7/2016 | Niehoff ................. H01H 47/32 361/170 |
| 2017/0166146 | A1 | 6/2017 | Kinoshita et al. |

FOREIGN PATENT DOCUMENTS

| | | | |
|---|---|---|---|
| DE | 102015000576 A1 | 7/2016 | |
| JP | H11301344 A | 11/1999 | |
| JP | 2006060924 A | 3/2006 | |
| JP | 2006062599 A | 3/2006 | |
| JP | 2007203929 A | 8/2007 | |
| JP | 2012105502 A | 5/2012 | |
| JP | 2016073068 A | 5/2016 | |
| WO | WO-2014117813 A1 * | 8/2014 | ............. H01H 9/542 |
| WO | 20160135126 A1 | 9/2016 | |

OTHER PUBLICATIONS

Korean Office Action, Korean Patent Application No. 10-2017-0133509, dated Aug. 2, 2019, 8 pages.
Japanese Office Action and English translation, Patent Application No. 2017-197398, dated Aug. 10, 2021, 17 pages.

* cited by examiner

INTELLIGENT SWITCH FOR AUTOMOTIVE APPLICATION

CROSS-REFERENCE TO RELATED APPLICATION

This application claims the benefit of the filing date under 35 U.S.C. § 119(a)-(d) of European Patent Application No. 16194028.3 filed on Oct. 14, 2016.

FIELD OF THE INVENTION

The present invention relates, in general, to electric switches for automotive applications and, in particular, to a resettable and/or programmable fuse.

BACKGROUND

Electrical/electronic (E/E) systems are found in many places within different subsystems in a vehicle: engine and powertrain, chassis, body and comfort, infotainment, navigation, driver assistance, and interactive systems. Cabling and network interfacing is accomplished by the wiring harnesses. Wiring harnesses alone are the third highest cost component (behind the engine and chassis) and also the third heaviest component (behind the chassis and engine) in a car. Thus, solutions that reduce this weight directly contribute to cost savings and environment benefits.

The continuous growth in the number of E/E features and advancements push the demand for a comprehensive and dynamic architecture that encompasses this complexity via a common interconnecting infrastructure. Such an infrastructure includes communication as well as power distribution, physical placement of components, and the mapping of functionality on the components. This requires different communication schemes and gateways to enable cross-networking between smart nodes. The general benefits of using a common E/E architecture are the possibility of reusing data (i.e., from sensors) for different applications, the optimization of the wiring harness, simple extensibility when adding new functions, and the support for having different expansion modules/stages.

Electric automotive switches are known from the art and are available with standardized sizes and/or connection means, (i.e., contact terminal for placing the switch in a circuit), such as a load circuit of an automobile. An electric fuse is a specific switch interrupting the load circuit in case of a specific condition, (e.g., overload, mismatch load, overvoltage, or failure of the device connected to the load circuit).

The automotive industry uses relays in combination with fuses tremendously in mostly centralized positions in a car. One problem with relays is that undesired arcing may occur between the contacts that may lead the contacts becoming welded shut, or make the relay fail due to the contact surface damage by the destructive arc energy upon switching events. U.S. Pat. No. 7,282,924 discloses an electricity system having an arc for detecting a sub-system including a relay unit, a current sensor, an analog circuit, a digital circuit, and a processing unit that is configured to commit the relay unit to disconnect the current in response to identifying arc faults. This raises questions on scalability and flexibility not to mention the cumbersome effort in replacement of fuses. Addition of more functions leads to extra junction boxes and the harness that comes along with it, increasing the weight of the vehicle, leading to higher emissions of $CO_2$.

The increased electric complexity in automobiles puts pressure on electric circuits and electric switches that need to be included in various connectors and fuses. The switches and fuses commonly used in the automotive sector are usually inflexible, merely switched to close and open the load circuit.

SUMMARY

An intelligent switch, constructed in accordance with the present invention, includes at least one inlet, at least one outlet, and a switch circuit electrically connecting the at least one inlet and the at least one outlet. The switch circuit has at least one of an electromechanical switching submodule and an electrical switching submodule and a control unit for controlling an operating state of the at least one of the electromechanical switching submodule and the electrical switching submodule.

In the following, the inventive electric automotive connector will be described by way of example with reference to the accompanying figures. Technical features of the individual embodiments described below may be arbitrarily combined or omitted if the technical effect obtained by the omitted technical feature is not relevant to the invention. Same elements or elements with the same technical effect will be labeled with the same reference numerals.

DETAILED DESCRIPTION OF THE EMBODIMENT(S)

Figure 1:
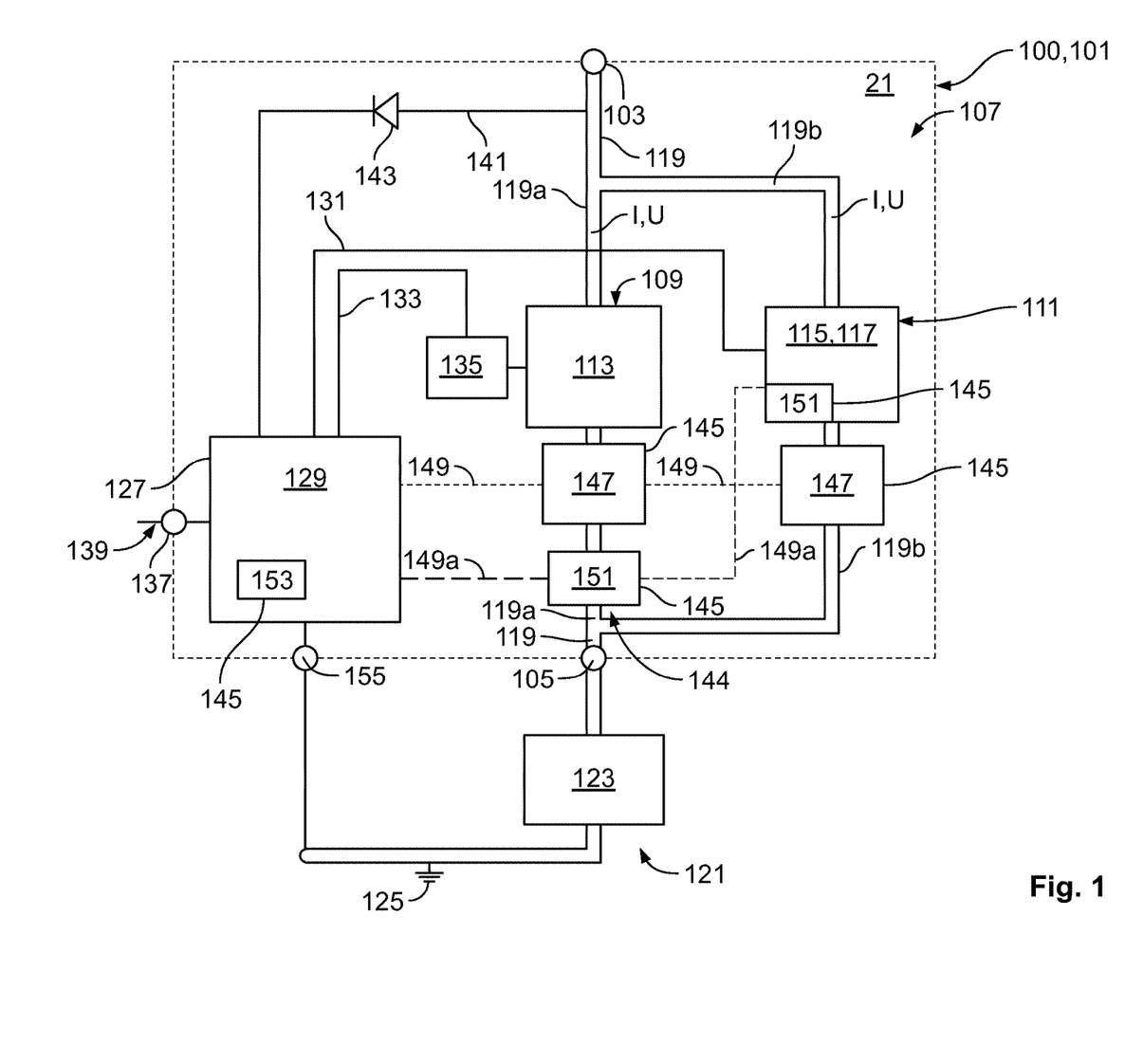
FIG. 1 is a diagram of an intelligent switch according to a first embodiment of the present invention.

In FIG. 1, a diagram of an intelligent switch 100 for automotive applications, constructed in accordance with the present invention, in particular a resettable or programmable fuse 101 is shown.

The intelligent switch 100 comprises at least one inlet 103 and at least one load outlet 105. The inlet 103 may be an input port, (e.g., for a load line). The outlet 105 may be an output port, (e.g., for a load line). The inlet 103 and the outlet 105 may be a terminal 9 or contact element (e.g., a contact pin or a contact socket) of the intelligent switch 100.

In the first embodiment shown in FIG. 1, the intelligent switch 100, (e.g., a resettable and/or programmable fuse 101) comprises exactly one inlet 103 and one outlet 105.

A switch circuit 107 electrically connects the at least one inlet 103 and the at least one outlet 105. The switch circuit 107 comprises at least one electromechanical switching submodule 109 as an electromechanical component 29 and at least one electrical switching submodule 111 as an electrical component 27.

In the exemplary embodiment shown in FIG. 1, the switch circuit 107 comprises one electromechanical switching submodule 109 and one electrical switching submodule 111. The electromechanical switching submodule 109, for example a monostable switching module 113, and the electrical switching submodule 111, for example a semi-conductor switch 115 such as a field-effect transistor 117 (e.g., a power MOSFET) are connected in parallel in the switch circuit 107. That is, the switch circuit 107 comprises, after the inlet 103, a path 119 which is divided into two subpaths 119a, 119b. The monostable switching submodule 113, (e.g., a monostable relay) is arranged in the subpath 119a. The semi-conductor switch 115 is arranged in the subpath 119b. After the electromechanical switching submodule 109 and the electric switching submodule 111, the first subpath 119a and the second subpath 119b are combined before the path 119 is finally connected to the outlet 105.

A monostable relay has the advantage that it reaches a safe state after power down that keeps the electromechanical switching submodule in one predetermined state, for example, in an open state, thus interrupting the load circuit. A bistable electromechanical switching module, such as a bistable relay is advantageous in that it merely requires very low coil power consumption for switching between its two switching (or operating) states.

Electromechanical switches, in particular a monostable relay requires manual resetting. Contrary thereto, it is possible to reset a semi-conductor switch remotely. Further, semi-conductor switches allow pulse width modulation, making it possible to control the voltage and current fed through the load path to the load, e.g. a lamp. Further, semi-conductor switches respond very quickly and are a small size, thus allowing miniaturization of the electric automotive switch/fuse. The quick response allows semi-conductor switches to be used as a soft fuse that disconnects the load before the current reaches values that are too high. The electric switching submodule may be a field-effect transistor that can operate at high voltages, e.g. within a 48 volt power net. Further, field-effect transistors require low power consumption for controlling the switch and may have diagnostic features on board, such as, for example a current, temperature or voltage detector.

The circuit 121, in the shown embodiment of the present invention, comprises, in addition to the intelligent switch 100 or fuse 101, an electrical load 123 which is led to ground 125 of, for example an automotive that is not shown in the case of using the switch 100 for an automotive application.

The intelligent switch 100, in the embodiment of the present invention shown in FIG. 1, further comprises a control unit 127, such as, for example, a microcontroller 129, for controlling an operating state of the switching submodules 109, 111. In the monostable switching submodule 113, the operating state may, for example, be "on" or "off", (i.e., the relay is either closed ("on") and thus connects the paths 119 from the inlet 103 to the outlet 105 via subpath 119a), or is "off", (i.e., disconnecting the path 119). In the electric switching submodule 111, the operating state may likewise be either "on" or "off", or corresponds to a certain value of current fed to the load 123 via pulse width modulation, thus enabling a variation of output voltage.

The control unit 127 is connected to the electromechanical switching submodule 109 via a driving line 131 and to the electric switching submodule 111 via another driving line 133. In case of monostable relays used as a monostable switching module 113, the driving line 133 connects the microcontroller 129 to a driver, here a relay driver 135. The driver 135 acts on the switching monostable switching module 113 and, upon receiving a corresponding signal from the control unit 127 via the driving line 133, brings the electromechanical switching submodule 113 into a certain operating state, commonly the "off"-state, in which it interrupts the path 119.

The control unit 127 comprises a control interface 137 for connecting the control unit 127 to a network system (not shown in detail) located outside of the intelligent switch 100. In the embodiment shown in FIG. 1, the intelligent switch 100 comprises a single control interface 137. In the shown embodiment of the present invention, the control interface 137 is one terminal 9 in a connector 1 (not shown in FIG. 1) of the intelligent switch 100.

The control interface 137 may be connected to a bus system 139 for connecting the control unit 127 of the intelligent switch 100 to a master controller, (e.g., an engine or electrical control unit (not shown) of an automobile). The bus system 139 may be, for example a LIN bus, or any other preferably single-wire network allowing to send data from a master controller to the control unit 127 of the intelligent switch 100 or sending information about the intelligent switch 100 from its control unit 127. However, other existing communication technologies, like a Controller Area Network (CAN), FlexRay, Media Oriented Systems Transport, and Low Voltage Differential Signaling, may also be used.

The fuse 101, in the embodiment of the present invention shown in FIG. 1, is a self-supporting module that does not require a separate power connection. The intelligent switch 100 withdraws its power from the path 119. To do so, the control unit 127 is connected to the inlet 103 via a power-supply line 141. In the shown embodiment of the present invention, an overvoltage protection 143, (e.g., a diode) is arranged in the power-supply line 141 thus avoiding damaging the microcontroller 129. In the shown embodiment of the present invention, the control unit 127 is further connected to a ground terminal 155.

In the embodiment of the present invention shown in FIG. 1, the intelligent switch 100 comprises a diagnostic submodule 144. The diagnostic submodule 144 comprises at least one sensor 145 for detecting at least one of the operating states of the switching submodule 109, 111, a path current I, a temperature T, and a voltage U. In the shown embodiment of the present invention, a contact state monitor 147 is arranged in each of the subpaths 119a, 119b. Via a status line 149, the contact state monitors 147 are connected to the control unit 127. The operating state of the switching submodule 109, 111, detected by the contact state monitors 147, may be outputted to the control unit 127 via the status line 149.

The intelligent switch 100 in the embodiment of the present invention shown in FIG. 1, further comprises a current sensor 151 in the first subpath 119a detecting the current I in said subpath 119a. The current may be continuously monitored by a HALL-effect current sensor. Via a further status line 149a, data representing the current I in the subpath 119b may be transmitted from the current sensor 151 to the control unit 127. The electric switching submodule 111, in the embodiment of the present invention shown in FIG. 1, may be a so-called smart FET 117, that is a semi-conductor switch 115 on the basis of a field-effect transistor 117, which furthermore comprises onboard a diagnostic device, such as a current sensor 151, thus combining protective and diagnostic features. The current sensor 151 of the smart FET 117 is also connected via a status line 149a to the control unit 127.

The intelligent switch 100 further comprises a temperature sensor 153. In the shown embodiment of the present invention, the temperature sensor 153 is an internal temperature sensor of the microcontroller 129.

In summary, the intelligent switch 100 comprises sensors 145 that are capable of detecting the operating state of the switching submodules 109, 111, the current, and consequently the voltage in the subpath 119a and 119b as well as the temperature. The microcontroller 129 may thus receive data concerning the contact state of the switching submodules 109, 111, the current and/or voltage in the subpath 119a and 119b and the temperature in the switch 100. Based on the respective data received from the sensors 145 via the status lines 149, 149a, the control unit 127 may decide, for example, whether there is an overload, an overvoltage, a short circuit, or thermal stability. In case there is no malfunction, (i.e., no overload, no overvoltage, no short circuit and thermal stability), the control unit 127 may send a status to the master controller of the automotive via the bus system 139 connected to the control interface 137. In case of a malfunction, (e.g., an overload, overvoltage, short circuit or thermal instability), the control unit 127 may take the appropriate measures by sending data via driving lines 131, 133 for accordingly changing the operating state of its switching modules 109, 111, (e.g., opening the monostable relay), thus interrupting the path 119.

The switch circuit 107 of the embodiment of the present invention shown in FIG. 1 may be on board a circuit board 21. In the shown embodiment, all electrical components 27 and electromechanical components 29 of the switch circuit 107 are in a single circuit board 21.

Figure 2:
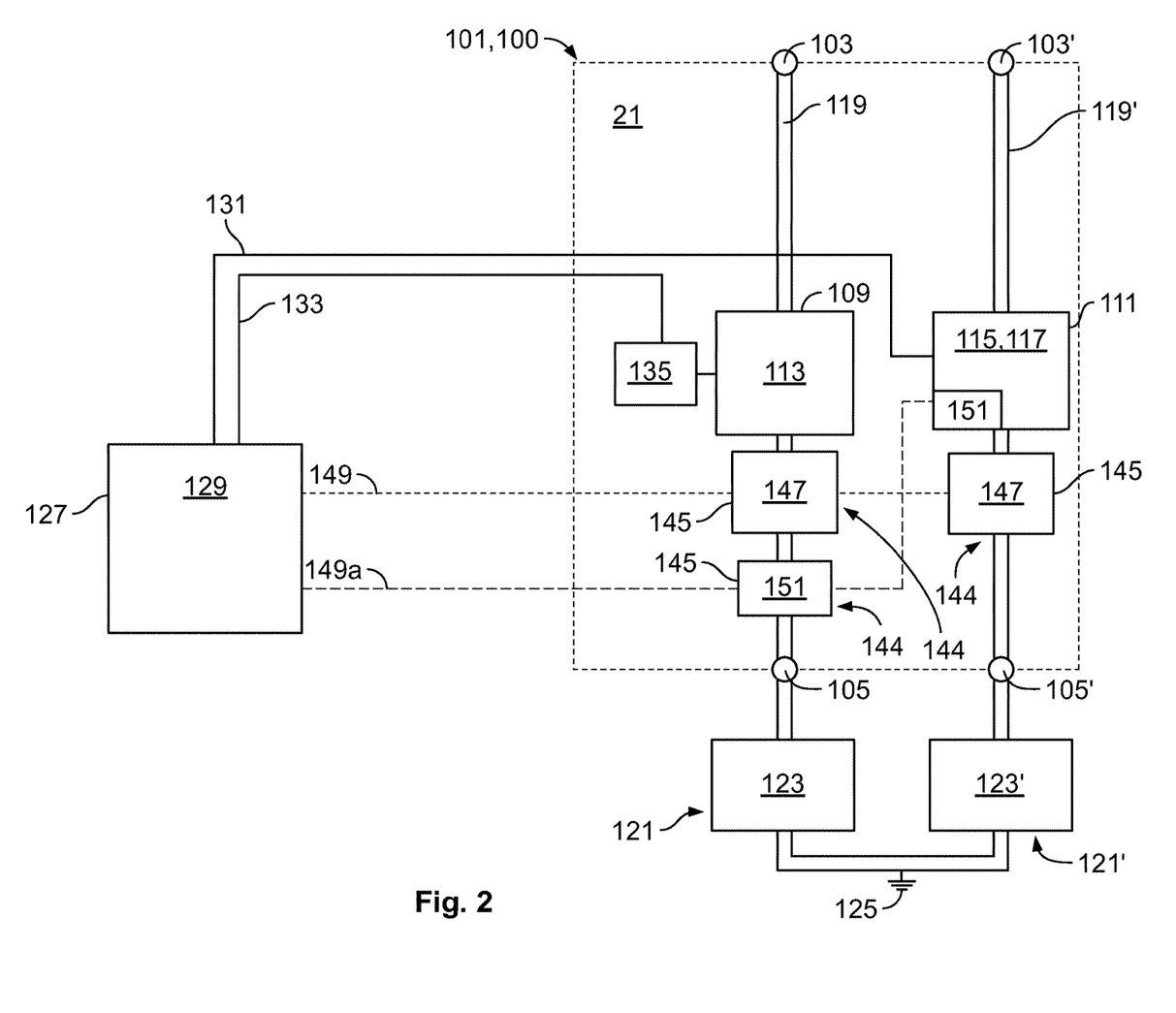
FIG. 2 is a diagram of an intelligent switch according to a second embodiment of the present invention.

FIG. 2 shows another embodiment of the intelligent switch 100 for automotive applications constructed in accordance with the present invention which may also be embodied as a resettable and/or programmable fuse 101. In the following only the differences of the embodiment of the intelligent switch 100 shown in FIG. 2, compared to the embodiment shown in FIG. 1 will be described.

The intelligent switch 100 of the embodiment of the present invention shown in FIG. 2 comprises a first path 119 and a second path 119'. Accordingly, the intelligent switch 100 comprises two inlets 103, 103', and two outlets 105, 105'. In the first path 119, an electromechanical switching submodule 109, (e.g., a monostable switching submodule 113/electric switching submodule 111) is arranged, the operating state of which may be changed via a driver 135. Similar to the embodiment shown in FIG. 1, a contact state monitor 147 and a current sensor 151 are arranged in the path 119.

In the second path 119', an electrical switching submodule 111 is arranged, as well as a contact state monitor 147 that is capable of detecting and outputting the operating state of the electric switching submodule 111. Circuits 121, 121' comprising the first path 119 and the second path 119', respectively, each comprise a different load 123, 123' that is connected to the ground 125 of, for example, an automobile.

The intelligent switch 100 of the embodiment of the present invention shown in FIG. 2 differs from the embodiment shown in FIG. 1 in that the control unit 127 is not onboard the intelligent switch 100, but a separate unit outside of the switch 100. The control unit 127 controls the switching submodules 109, 111 via driving lines 131, 133, connecting the control unit 127 to the electric switching submodule 111 directly and via the driver 135 to the electromechanical switching submodule 109. Further, status lines 149, 149a connect the control unit 127 to the sensors 145 of the intelligent switch 100.

In the embodiment shown in FIG. 2, the intelligent switch 100, e.g. an electric fuse 101, may act on two different paths 119, 119' for two different loads 123, 123'.

In a further alternative, which is not shown in the figures, instead of having two separate paths 119, 119', the electromechanical switching submodule 109 and the electric switching submodule 111 may be arranged in series in the same path. This could be achieved, for example, by connecting the outlet 105 shown in FIG. 2 to the inlet 103' and removing the load 123. Such an embodiment may be advantageous for critical loads, for which a redundancy in the fuse function achieved by connecting the switching submodules 109 and 111 in series. This further alternative thus enhances the safety. It makes the switch-off events more reliable by using two switching submodules in series.

Figure 3:
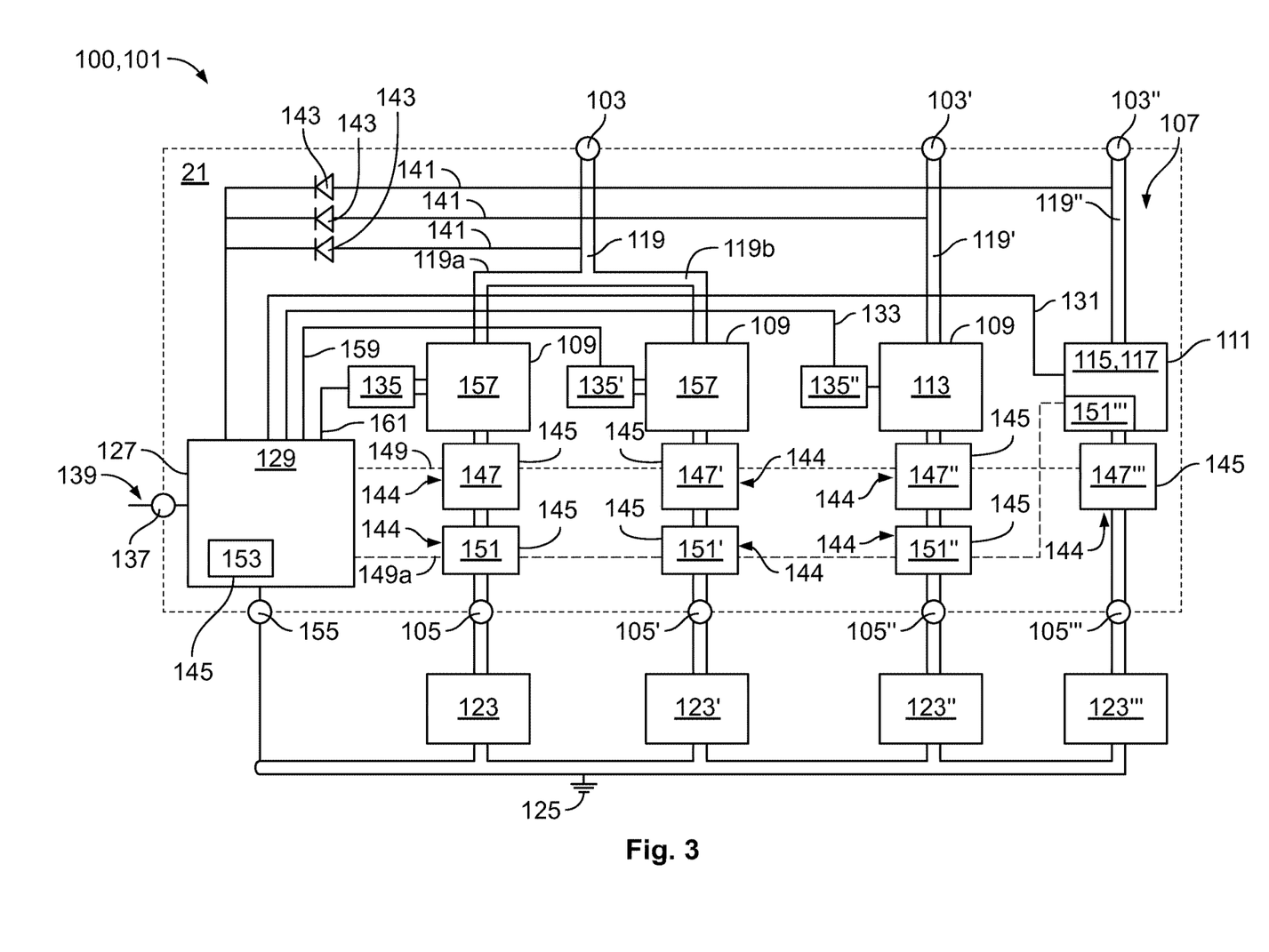
FIG. 3 is a diagram of an intelligent switch according to a third embodiment of the present invention.

In FIG. 3, another embodiment of an intelligent switch 100 according to the present invention is shown. The switch circuit 107 is designed to be connected to nine terminals 9 and comprises three inlets 103, 103', 103'', four outlets 105, 105', 105'', 105''', one ground terminal 155, and a control interface 137. Similar to the embodiment shown in FIG. 1, the intelligent switch 100 of the embodiment shown in FIG. 3 comprises all electrical components 27 as well as all electromechanical components 29 onboard the circuit board 21.

In the embodiment of the present invention shown in FIG. 3, the intelligent switch 100 is capable of handling three paths 119, 119', and 119''. Similar to the embodiment shown in FIG. 2, a monostable electromechanical switching submodule 109 is arranged in one path 119' corresponding to paths 119 in FIG. 2 and, in another path 119'', an electric switching submodule 111 is arranged, which principally corresponds to path 119'' in FIG. 3. A further path 119 comprises two electromechanical switching submodules 109 arranged in parallel. In the embodiment of the present invention shown in FIG. 3, these electromechanical switching submodule/subunits 109 are bistable switching subunits/submodule 157, which are driven by respective drivers 135, 135'. In contrast to a monostable switching submodule 113, a bistable switching submodule 157 may obtain two distinct states, which is indicated in the two lines drawn from the respective driver 135, 135' to its corresponding bistable switching submodule 157. The drivers 135, 135' are connected to the control unit 127 via driving lines 159, 161.

Of course, in alternative embodiments of the present invention, arbitrary combinations of switching submodules are possible. For example, the design shown in FIG. 3 may be varied so far as an electric switching submodule 111 may be connected in parallel with an electromechanical switching submodule in further path 119, and two electromechanical switching submodules 109, (e.g., one bi-stable relay and mono-stable relay), may be arranged in paths 119' and 119'', respectively.

Arranging an electromechanical switching submodule 109 and an electrical switching submodule 111 in parallel in one path allows use of the intelligent switch 100 as an age-booster solution for the electromechanical switching submodule 109. One problem with electromechanical relays is the undesired arcing between the contacts. The undesired arching might eventually lead the contacts shut, or make the relay fail due to the contact surface damage by the destructive arc energy upon switching events. The embodiment using a parallel combination of electrical switching submodule 111, (e.g., a power MOSFET), and an electromechanical switching submodule 109, such as a relay reduces the undesired arcing. For switching the load, first the electric switching submodule 111 switches on, and then the electromechanical switching submodule 109 takes over. This helps by passing the in-rush current through the electric switching submodule 111 and reduces the arcing effect on the contacts of the electromechanical switching submodule 109.

Although the control unit 127 is shown in the embodiments of FIGS. 1, 2, and 3 as a single unit, the intelligent switch 100 may either comprise more than one (e.g., two separate control units that is not shown). The separate control units may communicate and control different submodules 109, 111 of the switch 100. Further, they may communicate with each other. For example, one first control unit may comprise the input of a bus system and the output of the first control unit may be connected to the input of the second control unit. The output of the second control unit, in turn, is the output of the intelligent switch 100 in the bus system, connecting this switch 100 to another switch or the master.

The intelligent switch 100 shown in FIGS. 1, 2, and 3 or any other embodiment thereof may comprise an electrical connector 1 comprising a base assembly 11 having at one side thereof a connector face 7 comprising terminals 9 or contact elements which may correspond to or may be electrically connected to the inlet 103, the outlet 105, the control interface 137 of the control unit 127, or the ground terminal 155.

The electric connector 1 with the base assembly 11 may have an interior side 17 opposite the connector face 7, at which the switch circuit 107 is provided. As will be shown in the following, the connector face 7 may comprise at least three terminals 9, but preferably comprises the connector face having nine terminals 9.

As will be explained in detail below, the intelligent switch 100 for automotive application may comprise at least two circuit board sections 19 that are provided at the interior side 17 which extend away from the base assembly 11 and face other, wherein each of the at least two circuit board sections 19 comprises at least one electric 27/or electromechanical component 29 of the switch circuit 107.

Figure 4A:
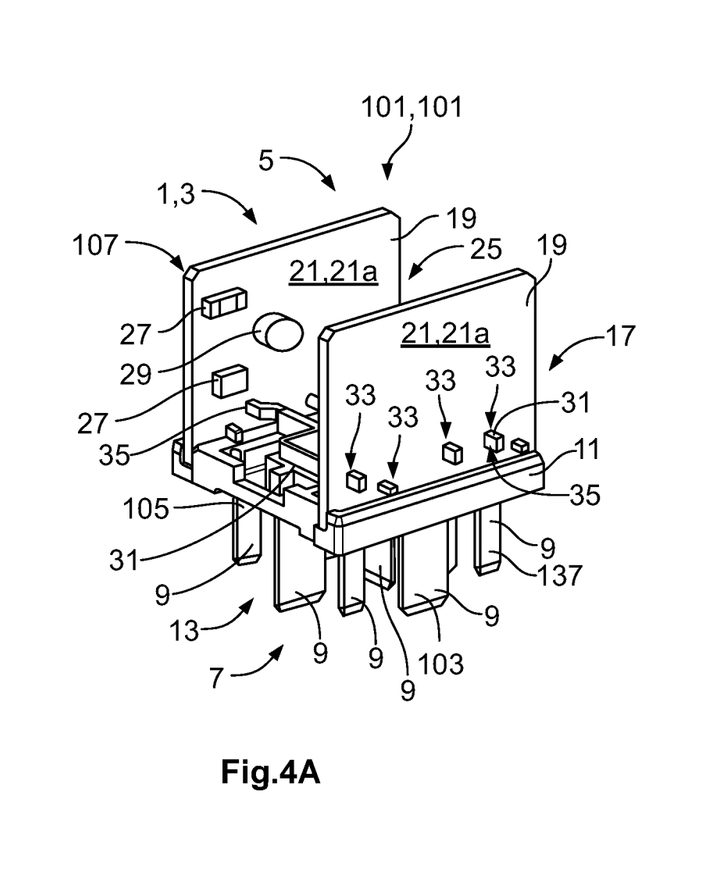
FIGS. 4A and 4B are perspective and side views, respectively, of a first embodiment of the electric connector according to the present invention.
Figure 4B:
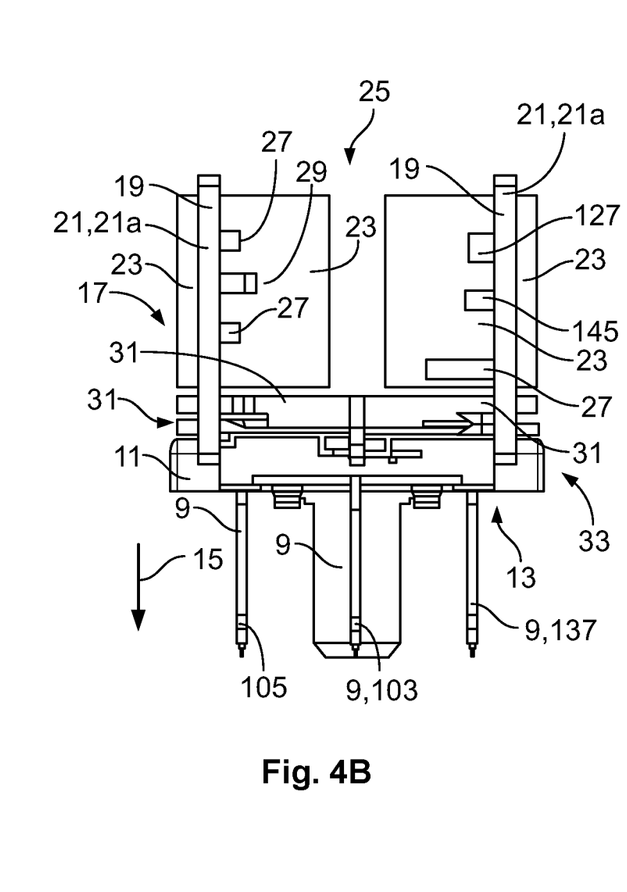

In FIG. 4, an embodiment of the intelligent switch 100, constructed in accordance with the present invention, is shown. The switch 100 comprises an electrical connector 1 shown in FIG. 4 is embodied as a fuse 101 or relay 3 in a plug-in form 5.

The plug-in form 5 is characterized by a connector face 7 which comprises a multitude of contact elements or terminals 9. The electric connector 1 further comprises a base assembly 11 which receives the terminals 9.

The contact elements or terminals 9 extend from the base assembly 11 to a connector side 13 in a connector direction 15. Along the connector direction 15, the electric connector 1 of the intelligent switch 100 may be plugged into a corresponding plug socket provided, for instance, in a car.

Opposite to the connector face 7, the electric connector 1 comprises an interior side 17 on which two circuit board sections 19 are provided which extend away from the base assembly 11.

The two circuit board sections 19 are oriented essentially perpendicular to the base assembly 11 and parallel to each other. The two circuit board sections 19 are each embodied on a circuit board 21, wherein the circuit boards 21 shown in the embodiment of FIG. 4 are individual circuit boards 21*a*. The circuit boards 21*a* or the circuit board sections 19 comprise the electrical 27 and electromechanical 29 components of the switch current 107.

Each of the individual circuit boards 21*a* defines a mounting volume 23 which faces towards a space 25 between the circuit boards 21 and a mounting volume 23 which faces away from space 25. The mounting volumes 23 are indicated in FIGS. 4A and 4B by rectangles.

Within the mounting volumes 23, each of the circuit board sections 19 may comprise at least one electrical component 27 or electromechanical component 29 of the switch current 107 illustrated in FIGS. 4A and 4B by two exemplary electric components 27.

FIGS. 4A and 4B further show transmitting elements 31 which are located and/or attached to the interior side 17 of the base assembly 11 and which are either connected to or monolithically embodied with the contact elements 9. The transmitting elements 31 are mechanically and electrically connected to the individual circuit boards 21*a* via through hole 33, (i.e., the transmitting elements 31 are inserted through holes 55 in the individual circuit boards 21*a* and subsequently soldered to the individual circuit boards 21*a*). The transmitting elements 31 transmit electric signals and/or power supply voltages from the terminals 9 to the electric components 27 or electromechanical components 29 arranged on the individual circuit boards 21*a*.

Figure 5A:
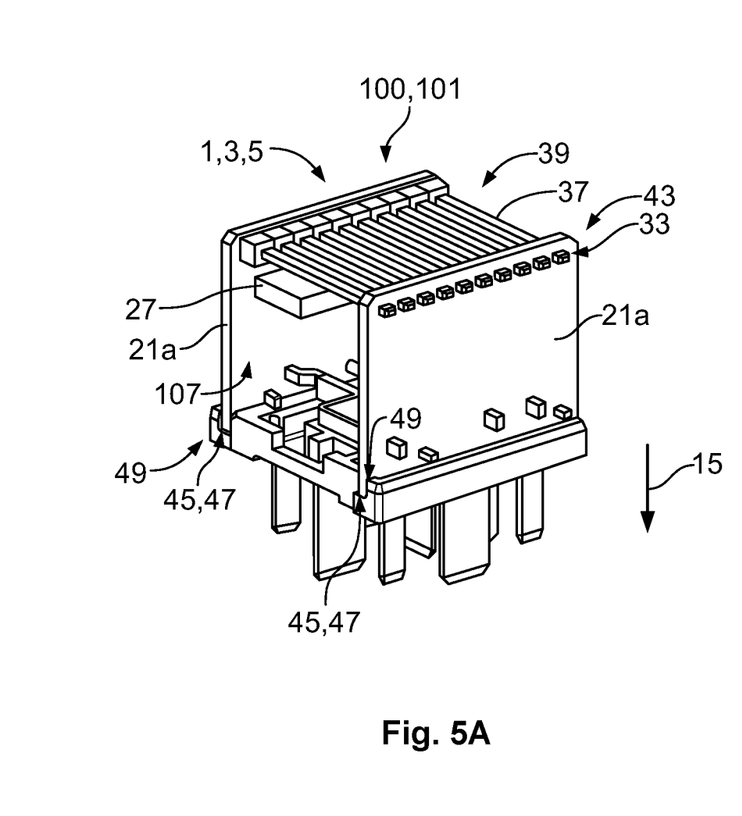
FIGS. 5A and 5B are perspective and side views, respectively, of a second embodiment of the electric connector according to the present invention.
Figure 5B:
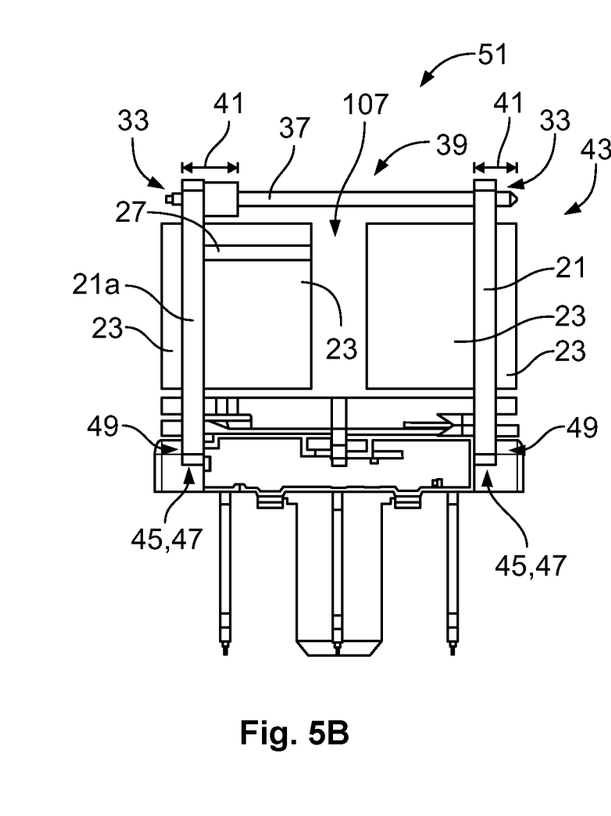

For reasons of visibility, the mechanical connection between the base assembly 11 and the circuit boards 21 will be explained with reference to FIGS. 5A and 5B. FIGS. 5A and 5B show a second embodiment of the electric connector 1, constructed in accordance with the present invention, for automotive applications, which is also embodied in the plug-in form 5.

The basic assembly of the second embodiment of the present invention shown in FIGS. 5A and 5B is essentially the same as for the first embodiment of FIGS. 4A and 4B, whereas in the second embodiment, a multitude of electrically conductive elements 37 (only one of the electrically conductive elements 37 is provided with a reference numeral) connect the two individual circuit boards 21*a*.

The electrically conductive elements 37 are attached to the individual circuit boards 21*a* via through hole 33. An established electric connection 39 allows for transmission of electrically coded data and/or supply voltages from one individual circuit board 21*a* to another individual circuit board 21*a*.

The electrically conductive elements 37 also mechanically stabilize the individual circuit boards 21*a* by preventing, or at least reducing, vibrations of the individual circuit boards 21*a* along a vibration direction 41 indicated by a double-headed arrow. The individual circuit boards 21*a* and the electrically conductive elements 37 are arranged in a U-shape 43.

FIGS. 5A and 5B furthermore show that the two individual circuit boards 21*a* are received in a form-fit member 45 arranged at the interior side 17 of the base assembly 11. The form-fit member 45 is embodied as a groove 47. The two individual circuit boards 21*a* are partially received within the two grooves 47 opening towards the interior side 17 such that each groove 47 engages in a form-fit 49 with the corresponding individual circuit board 21*a*.

The individual circuit boards 21*a* may be loosely received in the grooves 47 or may be press-fit into the grooves 47 or may be mechanically clamped or fixed to the grooves 47 by appropriate fixation means (e.g., a screw, which is not shown in FIGS. 5A and 5B).

The second embodiment of the electric connector 1, constructed in accordance with the present invention shown in FIGS. 5A and 5B comprises similar mounting volumes 23 as the first embodiment of FIGS. 4A and 4B, whereas the dimension of the mounting volumes 23 in a direction opposite to the connector direction 15 is slightly reduced due to the electrically conductive elements 37. The electrically conductive elements 37 of the second embodiment shown in FIGS. 5A and 5B, however, may protect electric components 27 from being accessed from an upper side 51.

Figure 6A:
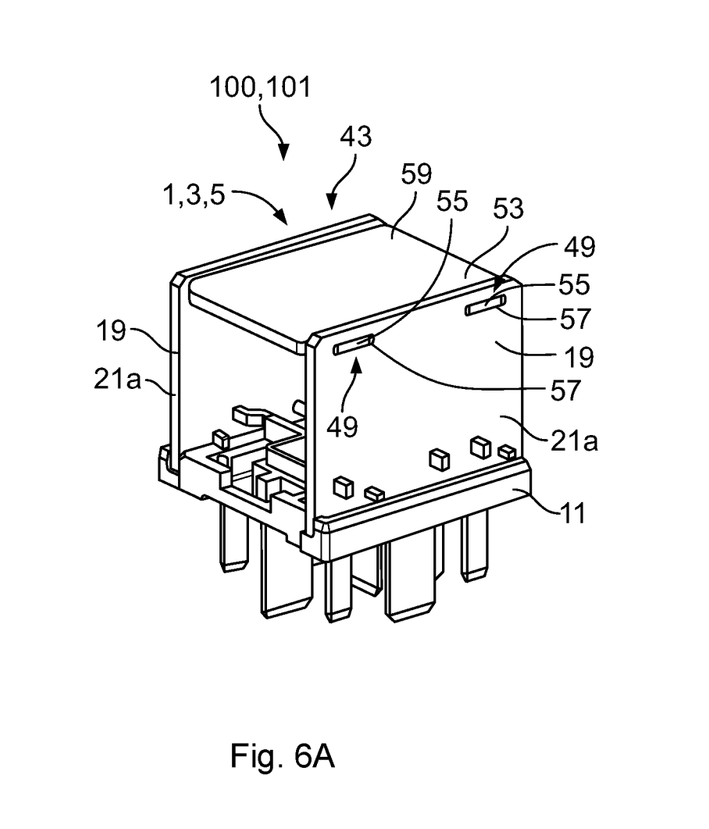
FIGS. 6A and 6B are perspective and side views, respectively, of a first embodiment of the electric connector according to the present invention.
Figure 6B:
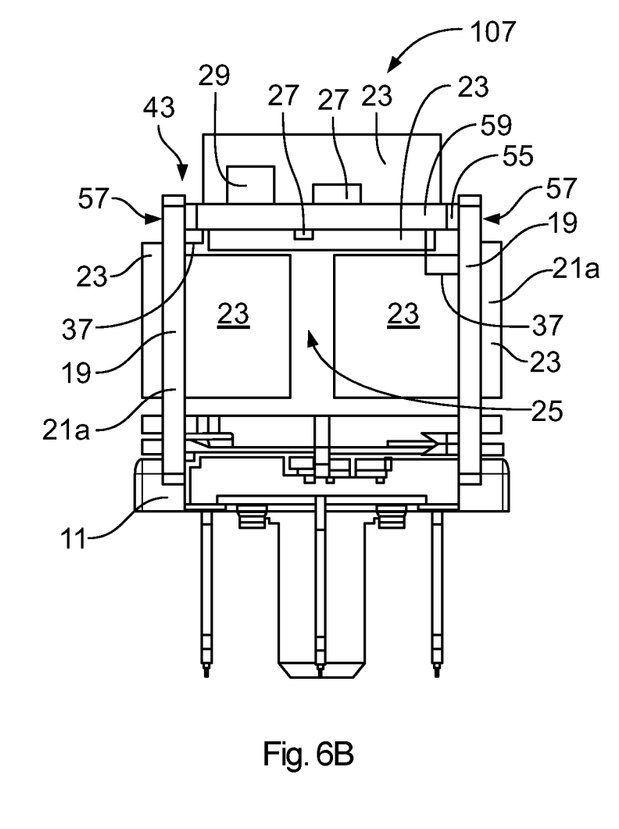

FIGS. 6A and 6B show a third embodiment of the electric connector 1, constructed in accordance with present invention, which is also embodied as a relay 3 in the plug-in form 5. This third embodiment comprises a further circuit board section 53 which is attached to the two circuit board sections 19 by four bearing members 55, which extend away from the further circuit board section 53 and are received in bearing receptacles 57 embodied in the two individual circuit boards 21a at a side thereof distal to the base assembly 11.

The bearing receptacles 57 and the bearing members 55 engage with each other in a form-fit 49, (i.e., the bearing members 55 abut the interior of the bearing receptacles 57), which detachably receive the bearing members 55. The bearing members 55 and the bearing receptacles 57 are essentially complementary to each other.

In the embodiment of the electric connector 1 shown in FIGS. 6A and 6B, the bearing members 55 do not extend in the space 25 or out of the bearing receptacles 57 of the individual circuit boards 21a.

The further circuit board section 53 is arranged on a further circuit board 59 which is oriented essentially perpendicular to the individual circuit boards 21a and essentially parallel to the base assembly 11. The further circuit board 59 defines additional mounting volumes 23 in which further electric components 27 or electromechanical components 29 may be mounted to the further circuit board 59. The further circuit board 59 may be electrically connected to at least one of the individual circuit boards 21a by an electrically conductive element 37 which is exemplarily shown in FIGS. 6A and 6B in the form of an angled electrically conductive element 37.

Also, in the embodiment of the intelligent switch 100, constructed in accordance with the present invention, for automotive applications shown in FIGS. 6A and 6B, the individual circuit boards 21a and the further circuit board 59 form a U-shape 43.

Figure 7A:
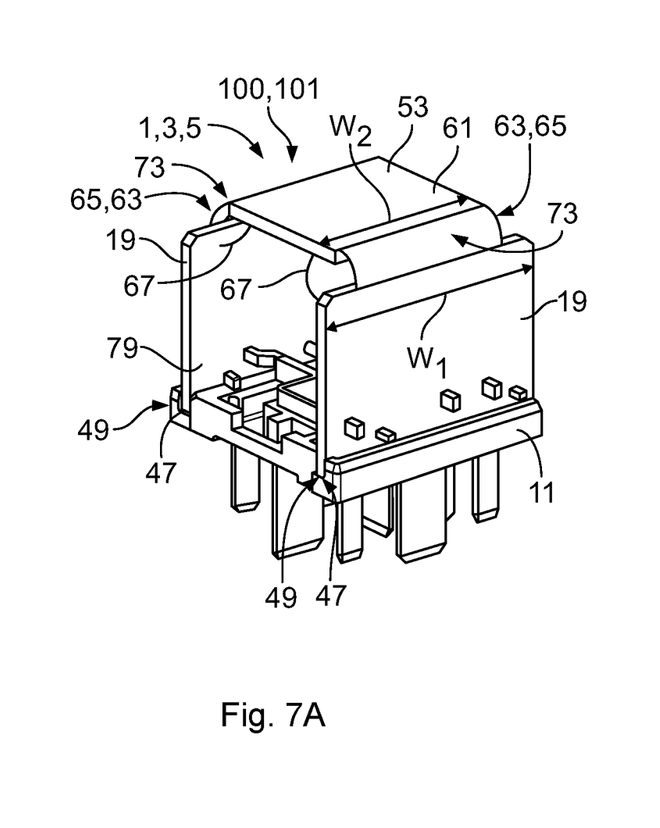
FIGS. 7A and 7B are perspective and side views, respectively, of a second embodiment of the electric connector according to the present invention.
Figure 7B:
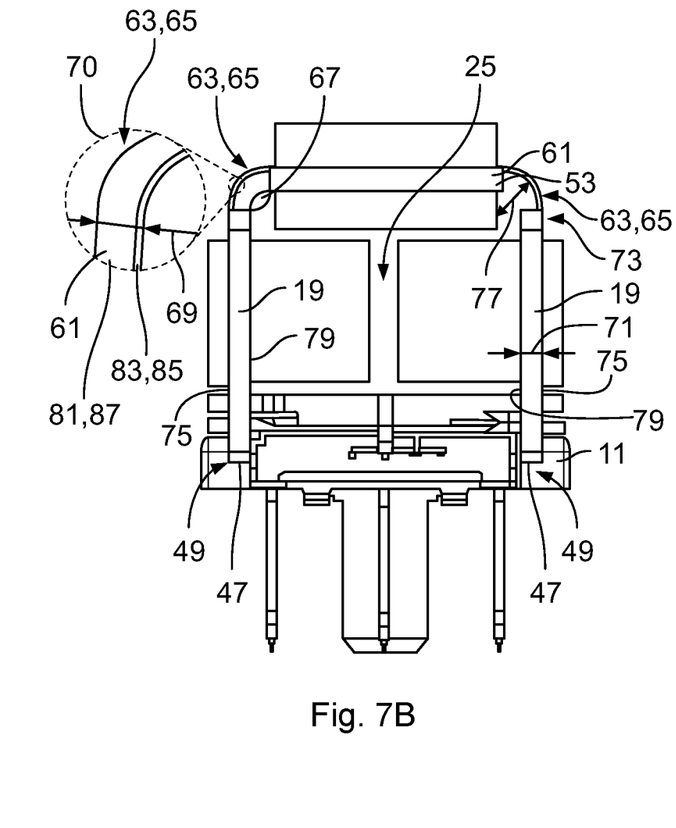

FIGS. 7A and 7B show a fourth embodiment of an electric connector 1, constructed in accordance with the present invention which is also embodied in the plug-in form 5. Distinguishing from the three embodiments shown in FIGS. 4A, 4B, 5A, 5B, 6A, and 6B, this embodiment of FIGS. 7A and 7B does not comprise individual circuit boards 21a, but is formed by a monolithic circuit board 61.

The at least two circuit board sections may be galvanically isolated from each other except for the electric connection via the at least one electrically conductive element. An arbitrary number of electrically conductive elements may be provided and may electrically connect the at least two circuit board sections to each other. A plurality of electrically conductive elements may be used to provide a driving current and/or electrically coded signals from one circuit board section to different electric components on the second circuit board section. The electrically conductive elements may also be used to transmit control signals from one circuit board section to the other circuit board section.

The monolithic circuit board 61 comprises two circuit board sections 19 which are essentially oriented perpendicular to the base assembly 11 and essentially parallel to each other, and a further circuit board section 53 which is essentially oriented perpendicular to the two circuit board sections 19 and essentially parallel to the base assembly 11.

The ends of the monolithic circuit board 61 are received in the grooves 47 of the base assembly 11 and are engaged in a form-fit 49 therewith. Between each of the two circuit board sections 19 and the further circuit board section 53, there is an angled section 63.

In the embodiment of the present invention shown in FIGS. 7A and 7B, the circuit board sections 19 have a CBS-width $w_1$ which is larger than a top-width $w_2$ of the further circuit board section 53. The angled sections 63 extend along the further circuit board sections 53 having the same top-width $w_2$.

The angled sections 63 of the embodiment shown in FIGS. 7A and 7B are bent sections 65 but may also be folded sections (not shown) in possible different embodiments. The bent sections 65 result in a bending angle 67 between each of the two circuit board sections 19 and the further circuit board section 53. The bending angle 67 is approximately a right angle of 90°. The angled sections 63 have a decreased thickness 69 (shown in zoom 70), which is smaller than the circuit board thickness 71. This decreased thickness 69 results in an increased flexibility 73 of the angled sections 63.

The angled sections 63 are located at side walls 75 of the electrical automotive connector 1 facing away from the space 25 in between the circuit board sections 19 and the further circuit board section 53. This has the advantage that a bending radius 77 of the angled sections 63 is larger than the bending radius 77 obtainable if the angled sections 63 are located at inner walls 79 of the intelligent switch 100. An increased bending radius 77 reduces the risk of fractures and/or severe damage respectively to the angled sections 63.

In the zoom 70 of FIGS. 7A and 7B, the detailed structure of the angled section 63 is depicted. In the region of decreased thickness 69, the monolithic circuit board 61 is thinned such that a metallic layer 81 and a residual layer 83 of circuit board material 85 remain. The metallic layer is preferentially a copper layer 87.

Although an electrical component 27 is only shown in FIGS. 4A, 4B, 5A, and 5B, electrical components 27 may also be in the embodiments of FIGS. 3, 4A, and 4B. The technical features described in the first embodiment of the electrical connector 1, constructed in accordance with the present invention, may be found in the subsequently described embodiments of FIGS. 5A, 5B, 6A, 6B, 7A, and 7B and have not been repeated for the sake of brevity. For simplification, not all electrical components 27 and electromechanical components 29 of the switch current 107 are shown in FIGS. 4A, 4B, 5A, 5B, 6A, 6B, 7A, and 7B. Hence, the conduits of the path 119 are omitted in FIGS. 4A, 4B, 5A, 5B, 6A, 6B, 7A, and 7B.

The entire intelligent switch 100 may be comprised in a connector housing, which is not shown in the figures but commonly applied for the electrical connectors 1 shown herein.

The footprint of the embodiments shown in FIGS. 4A, 4B, 5A, 5B, 6A, 6B, 7A and 7B is defined by the according standard used for the electric automotive connectors 1. The exemplary standard of the four embodiments shown is the mini ISO plug-in type standard, for example, for automotive relays or fuses. The arrangement and size of the contact elements 9 may be found in the German DIN standard DIN 72552. In contrast, it is possible to reset a semi-conductor switch remotely. Further, semi-conductor switches allow pulse width modulation, making it possible to control the voltage and current fed through the load path to the load, for example a lamp. Further, semi-conductor switches respond very quickly and are a small size, thus allowing miniaturization of the electric automotive switch/fuse. The quick response allows semi-conductor switches to be used as a soft fuse that disconnects the load before the current reaches values that are too high. The electric switching submodule may be a field-effect transistor that can operate at high voltages, (e.g., within a 48 volt power net). Further, field-effect transistors require low power consumption for controlling the switch and may have diagnostic features on board, such as, for example a current, temperature or voltage detector.

An intelligent switch for automotive applications constructed in accordance with the present invention module that has a combination of switching submodules (e.g., two bi-stable, one monostable and a Smart FET), offers more than one switching function in a single case. The parallel use of switches enables space and weight optimized architectures. Any other electrical combination of the included switching submodules increases functional safety. In addition to the electrical contacts for power signals, the inventive switch may be independently controlled by a 4-pin LIN (Local Interconnect Network) bus interface that provides direct communication with vehicle ECU. This introduces highest flexibility for the control architecture thereby addressing the need of de-centralized modules. A LIN is a concept for low cost automotive networks. The LIN is a serial communications protocol which efficiently supports the controller of mechatronics nodes in a distributed automotive application. The properties and advantages of the LIN bus system are that it is a single master with multiple slaves concept that is self-synchronizing having a deterministic signal transmission with signal propagation time computer built in advance. It is of low cost and high speed at a single-wire implementation. Due to the single-wire implementation, an embodiment of the electric automotive switch, in which the control unit comprises a single control interface connected to one terminal only, is possible. This allows an embodiment of the electric automotive switch comprising a standardized ISO socket or plug having nine terminals to house up to four different load paths. In this case, the nine terminals may be assigned to four different load inlets, four different load outlets and the control interface which, via a LIN bus, may communicate with a master controller. In this embodiment, using a standard connector face, nevertheless achieves a high degree of flexibility. However, the intelligent switch may likewise comprise more than one control interface and/or more than one control unit. Further, any kind of appropriate communication medium can be implemented including existing automotive communication technologies such as Controller Area Network (CAN), FlexRay (FR), Media Oriented Systems Transport (MOST) and Low Voltage Differential Signaling (LVDS). An advantage of using LIN is that it is a cheaper alternative to the CAN networks usually used for vehicles. LIN systems can be connected to a vehicle CAN network via a LIN/CAN gateway. This reduces the number of devices that need to communicate with the CAN network, eliminating the costs of CAN controllers for each of the switches. LIN complements CAN by being much cheaper and yet supporting the communication needed for typical automotive subsystems.

The present invention thus incorporates different protections such as those against overvoltage and reverse battery polarity, and diagnostic functions may be included as well. It can, therefore, represent the functionality of a fuse, since it disconnects the load in case of anomalies such as short circuit or overvoltage conditions. It enables any power distribution and control architectures in future vehicles.

The inventive intelligent switch not only helps reducing the number of control wires, it also offers a compact shape that is compatible with the existing platforms. It transforms a simple switching element (i.e., an electromechanical relay) to an intelligent device that has more than one switching function and may, in certain embodiments, additionally communicate with its commander-unit and provide information about its status and conditions. Based on different scenarios (e.g., software implemented in the control unit), it can also take decisions on its own, even before the ECU handles a fault event.

This switch has a flexible and modular architecture/hardware. Thus, based on customers' preferences, different generics with different number/type of the switching elements inside the module can be developed with minor—mainly software—modifications. Besides, the automatic node-addressing makes this switch quite robust for the repair and maintenance. No extra addressing modification is required for a replacement module.

In one specific embodiment of the electric switch according to the present invention and at least one terminal for the bus communication, up to a total of four switching submodules may be comprised in the switch. Even a switch with four switching submodules would be capable of being used together with a standardized ISO plug or socket having nine terminals, such as for example a mini-ISO plug according to DIN 72552. These nine terminals could, for example, be used for various inlets and outlets.

What is claimed:

1. An intelligent switch comprising:
a pair of inlets including a first inlet and a second inlet;
a pair of outlets including a first outlet and a second outlet; and
a switch circuit electrically connecting the inlets and the outlets and comprising:
 (a) an electromechanical switching submodule connecting the first inlet to the first outlet on a first path, the first inlet is connectable to the first outlet only by the electromechanical switching submodule,
 (b) an electrical switching submodule connecting the second inlet to the second outlet on a second path, the second inlet is connectable to the second outlet only by the electrical switching submodule,
 (c) a control unit for controlling an operating state of the electromechanical switching submodule and the electrical switching submodule,
 (d) a first diagnostic submodule arranged in the first path between the electromechanical switching submodule and the first outlet, and
 (e) a second diagnostic submodule arranged in the second path between the electrical switching submodule and the second outlet.

2. An intelligent switch according to claim 1, wherein the electromechanical switching submodule is at least one of a monostable switching submodule and a bistable switching submodule.

3. An intelligent switch according to claim 2, wherein the electric switching submodule is a semi-conductor switch.

4. An intelligent switch according to claim 3, wherein the control unit comprises at least one control interface for connecting the control unit to a network system located outside the intelligent switch.

5. An intelligent switch according to claim 4, wherein the control unit is connected to both switching submodules by a driving line.

6. An intelligent switch according to claim 5, wherein each diagnostic submodule comprises at least one sensor for detecting at least one of the operating state of a switching submodule, a path current, a temperature, and a voltage.

7. An intelligent switch according to claim 6,
(a) further comprising a status line, and
(b) wherein the at least one sensor is connected to the control unit by the status line.

8. An intelligent switch according to claim 7:
(a) further comprising an electrical automotive connector having:
  (1) a base assembly having at one side thereof a connector face with the inlets and the outlets, and
  (2) an interior side opposite to the connector face, and
(b) wherein the switch circuit is at the interior side.

9. An intelligent switch according to claim 8, wherein the connector face has at least three terminals.

10. An intelligent switch according to claim 9:
(a) further comprising a power supply line, and
(b) wherein the control unit further comprises a single control interface connected to or corresponding to one of the terminals and that the control unit is connected to at least one of the inlets by the power supply line.

11. An intelligent switch according to claim 10, further comprising at least one circuit board having at least one electrical or electromechanical component selected from the group of electromechanical switching submodule, electrical switching submodule, control unit, driving line, power supply line, status line, and sensor.

12. An intelligent switch according to claim 11, further comprising at least two circuit board sections at the interior side which extend away from the base assembly and face each other and each circuit board section comprises at least one electrical component or electromechanical component.

13. An intelligent switch according to claim 2, wherein the electric switching submodule is at least one of a field-effect transistor and a smart field-effect transistor.

14. An intelligent switch according to claim 8, wherein the connector face has a socket or plug having nine terminals.

* * * * *